April 2, 1957   G. THIELERS ET AL   2,787,754
FREQUENCY AND PHASE-CONVERTER
Filed Oct. 23, 1951
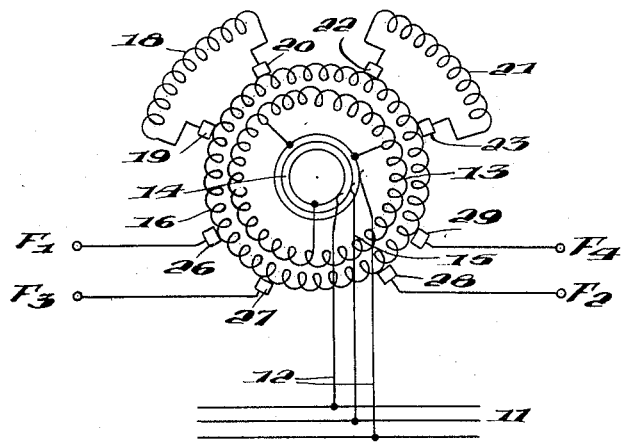
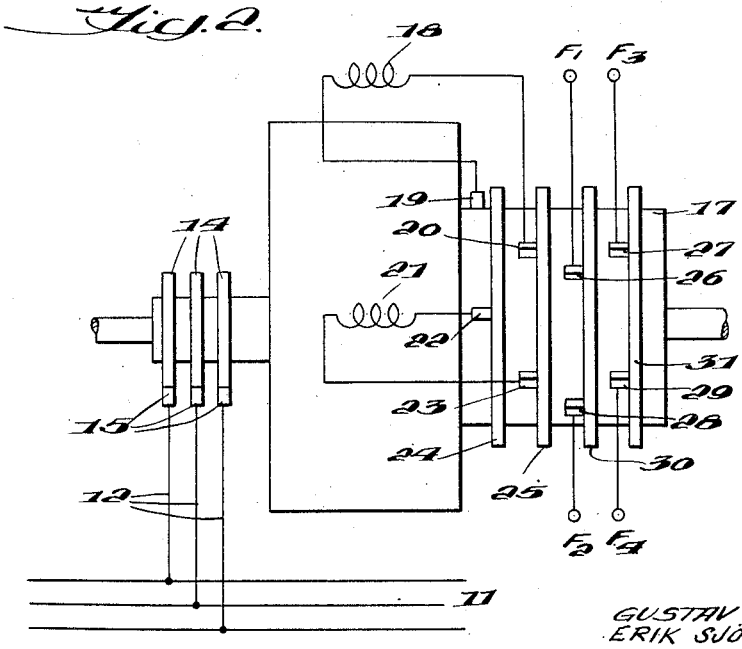
INVENTOR
GUSTAV THIELERS,
ERIK SJÖKVIST
BY *James Aiken*
ATTORNEYS United States Patent Office 2,787,754
Patented Apr. 2, 1957

2,787,754

FREQUENCY AND PHASE-CONVERTER

Gustav Thielers and Erik Sjökvist, Vasteras, Sweden, assignors to Allmänna Svenska Elektriska Aktiebolaget, Vasteras, Sweden, a corporation of Sweden Application October 23, 1951, Serial No. 252,774

Claims priority, application Sweden January 13, 1951

1 Claim. (Cl. 321—55)

The present invention refers to means for exciting two-phase or polyphase commutating machines for supplying low frequency current, for instance a stirring current to electrical furnaces.

For electro-dynamic stirring of the charge in electrical furnaces by means of stationary windings arranged beneath the bottom of the furnace and fed with polyphase current, special types of machines for supplying said polyphase current are advisable. The polyphase current should often preferably be of a rather low frequency. The most suitable frequency for such windings depends on the size of the furnace. i. e. with increasing size of the furnace the required frequency will decrease. In a common size of a furnace the most suitable stirring current will have a frequency of about 1 C./S.

An appropriate equipment for generating such a stirring current consists of a commutator machine with an exciter. The exciter should then serve as a frequency converter as well as a phase converter and should preferably provide the possibility of varying the output voltage.

An exciter providing all these advantages consists of a two- or polyphase commutator machine of a general type in which brushes are arranged in pairs on the commutator, the number of pairs corresponding to the number of phases of the machine to be excited, both brushes in each pair being connected to the terminals of individual phases of the stator winding of the machine to be excited.

One object of the present invention is to provide an improved alternating current commutating machine of the type shown and described in the specification of United States Reissue Patent No. 14,031 reissued December 14, 1915, and the improvements according to the present invention are diagrammatically shown in the same type of diagram as in the said patent.

One embodiment of the invention is diagrammatically shown in the accompanying drawings, in which:

Fig. 1 is a circuit diagram; and

Fig. 2 shows in side elevation a commutator machine embodying the invention.

In the drawings a commutator machine known per se is shown with a three-phase primary winding 13 on the rotor connected to the line 11 by means of slip rings 14, brushes 15, resting against them, and conductors 12. The rotor is also provided with a so called regulator winding 16 connected to a commutator 17. In this case the stator of the machine is wound with two phases, and the terminals of each one of the windings 18 and 21 for each phase are connected to pairs of brushes 19, 20 and 22, 23 respectively. One brush for each phase 19, 22 is arranged on a movable brush-rocker 24. The other brush 20, 23 for each phase is arranged on another movable brush-rocker 25. The angular difference between the brushes 19 and 22 as well as the brushes 20 and 23 shall in this case be 90 electrical degrees, as the exciter is intended for the excitation of a two-phase machine.

Two further pairs of brushes are provided. The brushes 26 and 28 are arranged on a brush-rocker 30 with an angle of 90 degrees between the brushes. The brushes 27, 29 are arranged on another brush-rocker 31, the angular difference between the brushes being 90 degrees. Terminals of the stator phases of the machine to be excited are connected to terminals F1, F3 and F2, F4 respectively. The terminal F1 is connected to brush 26 and the terminal F3 to brush 27. In the same way terminal F2 connects brush 28 and terminal F4 brush 29.

In the stator windings 18 and 21 a current is induced of slip frequency, and this frequency may be varied by moving the rockers 24 and 25 so that the brushes 19, 20 and 22, 23 respectively move towards and from each other. A voltage of the set frequency will be applied to the terminals F1, F3 and F2, F4 respectively. In an individual manner the voltage between said terminals may be varied by moving the rockers 30 and 31, so that the brushes 26, 27 and 28, 29 respectively move towards or from each other.

An exciter of the described type has the advantage of being at the same time a frequency-converter as well as a voltage-adjustor and a phase-converter. Owing to its special properties it is able to transform power irrespective of the number of cycles. This is an obvious advantage in comparison with asynchronous machines without commutator if it is desired to derive low frequency current from such machines by utilizing the slip frequency. The voltage adjusting will be performed without active losses. Although the machine is shown provided with four separate brush-rockers, it may be possible to omit one of said rockers, for instance by arranging the brushes 26, 28 on one of the brush-rockers 24, 25. In some cases it may be permitted to omit one pair of brushes, for instance the brushes 26, 28, and to connect the terminals F1, F2 to the brushes on one of the brush-rockers 24, 25.

We claim as our invention:

A frequency and phase converter consisting of an alternating current commutating machine, comprising a stator and a rotor with shaft and commutator, two separate rotor windings, slip rings carried on said rotor shaft, the phase windings of one of the rotor windings being connected each one to one slip ring, an alternating current line, means supplying said alternating current to said slip rings, connections connecting said other rotor winding with said commutator, two separate brush-rockers each carrying sets of brushes engaging said commutator, a stator winding for each phase, each phase winding of which is connected to one brush on each of said brush-rockers, and at least one additional independently movable brush-rocker carrying at least one set of brushes bearing on said commutaor, outlet terminals for the stator phases of said machine, each pair of said outlet terminals being connected to brushes of the machine including one brush on said additional brush-rocker.

References Cited in the file of this patent

UNITED STATES PATENTS

| Re. 14,031 | Schrage | Dec. 14, 1915 |
| 1,590,030 | Hull | June 22, 1926 |
| 1,753,322 | Tanner | Apr. 8, 1930 |
| 1,831,564 | Hull | Nov. 10, 1931 |
| 1,879,229 | Heinrich | Sept. 27, 1932 |
| 2,420,266 | Schwartz | May 6, 1947 |